Nov. 17, 1925.

G. BURANDT 1,562,410

COLLAPSIBLE LUGGAGE CARRIER

Filed Feb. 27, 1924

Witness
Helen Burndollar

Inventor
Gustav Burandt
by Bair & Freeman
Attorneys

Patented Nov. 17, 1925.

1,562,410

UNITED STATES PATENT OFFICE.

GUSTAV BURANDT, OF ST. PAUL, MINNESOTA, ASSIGNOR TO MARQUETTE MANUFACTURING COMPANY, OF ST. PAUL, MINNESOTA.

COLLAPSIBLE LUGGAGE CARRIER.

Application filed February 27, 1924. Serial No. 695,443.

*To all whom it may concern:*

Be it known that I, GUSTAV BURANDT, a citizen of the United States, and a resident of St. Paul, in the county of Ramsey and State of Minnesota, have invented a certain new and useful Collapsible Luggage Carrier, of which the following is a specification.

The object of my invention is to provide a collapsible luggage carrier of simple, durable and comparatively inexpensive construction.

More particularly, my invention relates to a luggage carrier adapted to be secured to a running board of an automobile and so arranged that it may be collapsed to such a position that it will rest against the edge of the running board itself and be almost unnoticeable.

Still a further object is to provide a pair of bars having a number of spaced links pivotally connected thereto so that the bars may be arranged side by side with the links received therebetween or may be spaced apart with the links arranged at right angles to the bars, and a locking rod secured to one of the bars and adapted to coact with the other bar for retaining the links in vertical position where the structure will be retained in position to serve as a luggage carrier.

Still a further object is to provide a catch member on one of said bars adapted to coact with the locking rod when the parts are in their collapsed or inoperative position for retaining them in that position.

Still a further object is to provide a pair of angle iron bars arranged side by side so that they form a casing for covering a number of links secured thereto when the luggage carrier is in inoperative position.

Still another object is to provide a latch member for positively securing the locking bar in operative position for holding the luggage carrier in operative position.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1:
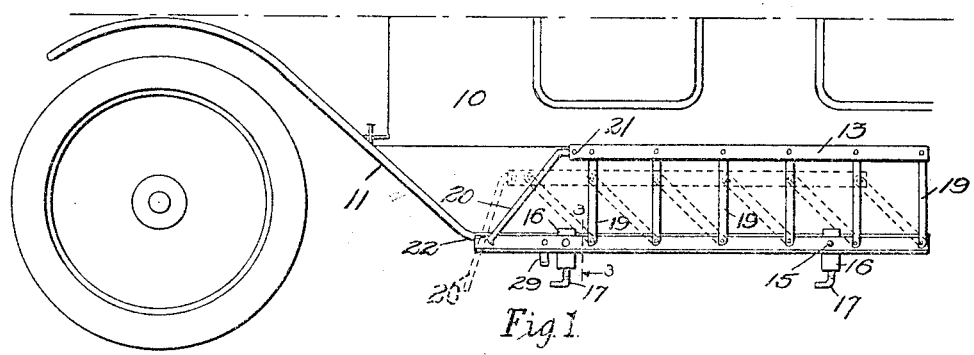
Figure 1 is a side elevation of an automobile with my improved luggage carrier shown thereon in operative position, the dotted lines showing the position the parts will assume when moved to inoperative or collapsed position.
Figure 2:
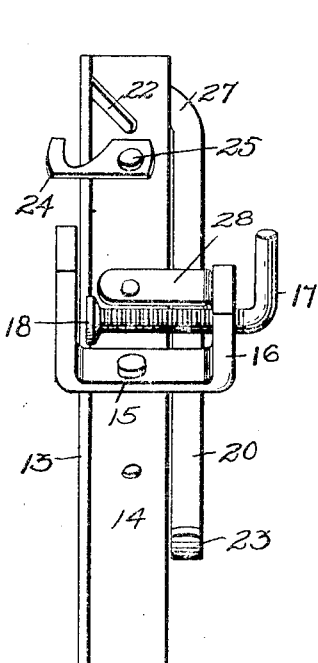
Figure 2 is an end view of the luggage carrier when collapsed, looking at it from an angle.

In the accompanying drawings, I have used the reference numeral 10 to indicate generally an automobile body with the ordinary front fender 11 and the running board 12 arranged between the front and rear fenders of the automobile.

Figure 3:
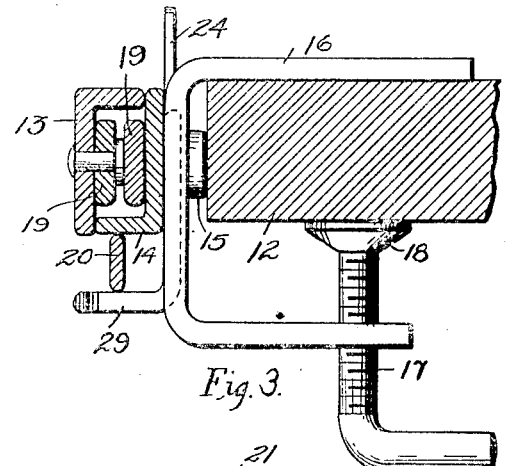
Figure 3 is a detail sectional view taken on line 3—3 of Figure 1 showing the luggage carrier in its collapsed position.

My improved luggage carrier consists of a pair of angle iron bars 13 and 14, which are so positioned that their interior surfaces face each other and at the same time form a channel shaped casing due to the positioning of the angle iron bars 13 and 14, as clearly shown in Figure 3 of the drawings.

The angle iron bar 13 may be properly termed the upper bar, while the other bar 14 may be properly termed the lower bar.

Secured to one side of the lower bar 14 by means of the rivets 15 are the clamp yokes 16. A clamp screw 17 having a swivel head 18 thereon is mounted in each of the clamp yokes 16 and adapted to abut against the underside of the running board 12 for securely retaining the luggage carrier in position.

The lower bar 14 is somewhat longer than the upper bar 13, as clearly shown in Figure 1 of the drawings.

Pivotally mounted on the lower bar 14 are a number of links 19, which in turn have their free ends pivotally connected to the upper bar 13. The links 19 are capable of movement to position from substantially vertical to position where they will be parallel with the bars 13 and 14, the dotted line position showing how the links 19 may be moved.

When the links 19 are in their vertical position, then the two bars 13 and 14 are spaced apart and when in this position, the structure serves as a luggage carrier.

In order to retain the bar 13 in spaced position from the bar 14 and the links 19 in vertical position, I provide a locking rod 20 which is pivotally secured to the upper bar 14 by means of a rivet 21.

The bar 14 has formed in it an inclined notch 22 which receives one end of the locking rod 20. The locking rod 20 has its free end formed with a hook 23 which is received in the notch 22.

In order to retain the locking rod 20 in its locking position, I mount a latch 24 on the back side of the bar 14 by means of a rivet 25, which latch is adapted to extend over the locking rod 20 when it is received in the notch 22.

From the construction of the parts just described, it will be seen that when the parts are in the position shown in solid lines in Figure 1 of the drawings that a luggage carrier is had.

The lower side of the bar 14 in one of its ends is formed with a notch 26 into which the locking rod passes when the parts are moved to collapsed or inoperative position.

In order to move the parts to inoperative position, it is necessary to disengage the latch 24 and then raise the locking rod 20 so that it is free from the notch 22.

The locking rod 20 is then passed through the opening or notch 26 for permitting the upper bar 13 and the links 19 to swing to position shown in the dotted lines in Figure 1 and to continue to swing until the bar 13 is brought to position substantially by the side of the bar 14 where the links 19 will be received therebetween.

The locking rod 20 has one of its ends near the rivet 21 curved, as at 27.

A catch member 28 is fastened to the back side of the lower bar 14 and has an outturned projection 29 thereon.

Figure 4:
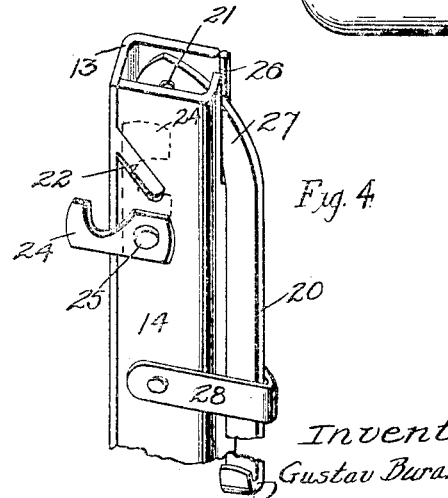
Figure 4 is a detail, perspective view of one end of the luggage carrier showing the locking bar for retaining the same in collapsed position.

The locking rod 20 may be sprung outwardly a sufficient amount so as to permit it to pass beyond the projection 29 and then be received between the lower bar 14 and the projection 29 of the catch member 28. The catch member 28 and locking rod 20, when the parts are in closed position, are clearly illustrated in Figure 4 of the drawings.

The locking rod 20, when in engagement with the catch member 28, will retain the two bars 13 and 14 side by side with all of the links substantially concealed therebetween.

When it is desired to move the luggage carrier to operative position all that is necessary is to spring the locking rod 20 forwardly a short distance so that it clears the projection 29, and the bar 13 is then free to swing to position shown in solid lines in Figure 1 and at which time it will, together with the remainder of the structure, serve as a luggage carrier.

It will be noted that I have provided a very efficient luggage carrier, which occupies a minimum amount of space along the edge of the running board when not in use and which can be quickly and easily moved to operative position.

With the kind of luggage carrier forming a part of my invention, it is possible to retain the luggage carrier on the running board when in inoperative position without interfering with the use of the running board for other purposes.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. A luggage carrier comprising a pair of bars, a plurality of links pivoted to the respective bars to permit the movement of the bars from substantially spaced horizontal position to position side by side and vice versa and means for locking said bars in their side by side position with the links arranged in horizontal position, said means including a pivoted locking rod having one end curved, a notch formed in one end of one of said bars, said locking rod adapted to swing over the end of the bar having the notch therein and be received therein.

2. A collapsible luggage carrier adapted to be secured to a running board of an automobile, comprising a bar, a plurality of links, pivoted at one of their ends to said bar and at the other ends to another part of the carrier, said links being capable of movement from position parallel with said bar to position vertical to said bar, and means connected with said bar for retaining the luggage carrier in collapsed position, said means including a rod pivoted to said bar and adapted to extend around a fixed member on another part of the luggage carrier.

3. A collapsible luggage carrier adapted to be secured to a running board of an automobile comprising a pair of bars, links pivoted at their ends to said bars for permitting one of said bars to be moved relative to the other with a longitudinally swinging movement, a locking rod pivoted to one of said bars adapted to coact with the other of said bars for maintaining the carrier in raised position and adapted to extend below said lower bar and substantially parallel therewith when the carrier is in closed position for holding the same collapsed.

4. A luggage carrier comprising a pair of bars, a plurality of links pivoted to the respective bars to permit the movement of the bars from substantially spaced horizontal position to position side by side and vice versa and means for locking said bars in their side by side position with the links arranged in horizontal position, said means including a pivoted locking rod having one end curved, a notch formed in one end of one of said bars, said locking rod adapted to swing over the end of the bar having the notch therein and be received therein, and a second notch in the bar having the first notch therein adapted to receive said locking rod for retaining the parts in raised position.

5. A luggage carrier comprising a pair of bars, a plurality of links pivoted to the respective bars to permit the movement of the bars from substantially spaced horizontal position to position side by side and vice versa and means for locking said bars in their side by side position with the links arranged in horizontal position, said means including a pivoted locking rod having one end curved and a hook on its other end, a notch formed in one end of one of said bars, said locking rod adapted to swing over the end of the bar having the notch therein and be received therein, and a second notch in the bar having the first notch therein adapted to receive the hook end of said locking rod for retaining the parts in raised position.

6. A luggage carrier comprising a pair of bars, a plurality of links pivoted to the respective bars to permit the movement of the bars from substantially spaced horizontal position to position side by side and vice versa and means for locking said bars in their side by side position with the links arranged in horizontal position, said means including a pivoted locking rod having one end curved, a notch formed in one end of one of said bars, said locking rod adapted to swing over the end of the bar having the notch therein and a latch member adapted to coact with the curved end of said locking rod.

7. A luggage carrier comprising a pair of bars, a plurality of links pivoted to the respective bars to permit the movement of the bars from substantially spaced horizontal position to position side by side and vice versa and means for locking said bars in their side by side position with the links arranged in horizontal position, said means including a pivoted locking rod having one end curved, a notch formed in one end of one of said bars, said locking rod adapted to swing over the end of the bar having the notch therein and be received therein, with a portion of the locking rod resting below the under side of said last bar and engaged by a catch member.

8. A collapsible baggage carrier comprising, a lower rail, means for attaching the same to the running board of an automobile or the like, an upper rail, links pivotally connecting the upper and lower rails, a lock link pivotally connected with the upper rail and having detachable engagement with the lower rail, said lock link being adapted to be shifted to a position beneath the lower rail when the upper rail is in the lowered position, and means for detachably connecting the free end of the lock link with the lower rail when the device is collapsed.

Des Moines, Iowa, February 18, 1924.

GUSTAV BURANDT.